(12) United States Patent
Bearman et al.

(10) Patent No.: US 7,539,983 B2
(45) Date of Patent: May 26, 2009

(54) TOOL FOR PROCESSING SOFTWARE PROGRAMS USING MODIFIED LIVE-NESS DEFINITION

(75) Inventors: Ian M. Bearman, Seattle, WA (US); James J. Radigan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 11/039,241

(22) Filed: Jan. 18, 2005

(65) Prior Publication Data

US 2006/0174227 A1 Aug. 3, 2006

Related U.S. Application Data

(63) Continuation of application No. 11/036,862, filed on Jan. 14, 2005.

(51) Int. Cl.
*G06F 9/45* (2006.01)
(52) U.S. Cl. .................. 717/146; 717/154; 717/155; 717/157
(58) Field of Classification Search .......... 717/140, 717/141, 142, 143, 144, 146, 152, 154, 155, 717/156, 157
See application file for complete search history.

(56) References Cited

U.S. PATENT DOCUMENTS

| | | | | | |
|---|---|---|---|---|---|
| 5,355,494 | A | * | 10/1994 | Sistare et al. | 717/154 |
| 5,642,512 | A | * | 6/1997 | Tanaka et al. | 717/153 |
| 5,659,754 | A | * | 8/1997 | Grove et al. | 717/158 |
| 5,778,233 | A | * | 7/1998 | Besaw et al. | 717/154 |
| 5,943,499 | A | * | 8/1999 | Gillies et al. | 717/155 |
| 6,064,820 | A | * | 5/2000 | Subrahmanyam | 717/160 |
| 6,113,651 | A | * | 9/2000 | Sakai et al. | 717/154 |
| 6,128,775 | A | * | 10/2000 | Chow et al. | 717/156 |
| 6,363,522 | B1 | * | 3/2002 | Click et al. | 717/160 |
| 6,412,109 | B1 | | 6/2002 | Ghosh | |
| 6,487,716 | B1 | * | 11/2002 | Choi et al. | 717/159 |
| 6,523,173 | B1 | * | 2/2003 | Bergner et al. | 717/152 |
| 6,651,247 | B1 | * | 11/2003 | Srinivasan | 717/161 |
| 6,654,952 | B1 | * | 11/2003 | Nair et al. | 717/157 |
| 6,898,787 | B2 | * | 5/2005 | Thompson et al. | 717/152 |
| 7,069,545 | B2 | * | 6/2006 | Wang et al. | 717/131 |
| 7,100,156 | B2 | * | 8/2006 | Archambault | 717/159 |
| 7,155,707 | B2 | * | 12/2006 | Clarke | 717/144 |
| 7,219,334 | B2 | * | 5/2007 | Koseki et al. | 717/131 |
| 2004/0221280 | A1 | * | 11/2004 | Bolton et al. | 717/151 |
| 2004/0226005 | A1 | * | 11/2004 | Tarditi | 717/151 |
| 2006/0161908 | A1 | | 7/2006 | Bearman | |

\* cited by examiner

*Primary Examiner*—Wei Y Zhen
*Assistant Examiner*—Matthew J Brophy
(74) *Attorney, Agent, or Firm*—Wolf, Greenfield & Sacks, P.C.

(57) ABSTRACT

A compiler that forms an intermediate representation of a program using a flow graph with less than all possible edges used to model asynchronous transfers within the program. The flow graph is formed in multiple phases. In one phase, the flow graph is formed without modeling asynchronous transfers. In later phases, representations of the effects of the asynchronous transfers are selectively added. As part of the later phases, edges modeling a possible asynchronous transfer are added to the flow graph following definitions in protected regions of variables that are live outside the protected region. A modified definition of live-ness of a variable is used to incorporate use of the variable in any region, including the protected region, following an asynchronous transfer. Edges from the protected region are also added to the model if the only use of the defined variable is in a handler.

18 Claims, 11 Drawing Sheets

```
class test
{
    public static int Main()
    {
        int a, b, c, x, y, z;
        ...
        try {
            a = foo();
            b = bar();
            y = a + b;
            x = b / c;
            y = a + c + b;
            z = x + c;
        }
        catch(System.Exception e) {
            System.Console.WriteLine("Error caught");
        }
        finally {
            System.Console.WriteLine("Value of Y is {0}", y);
        }
        return (y + 13);
    }
}
```

100

120
112
114
121
122
123
124
125
130

```
514  OPTRY
520       OPONERROR L1
          OPONERROR L2
522       A = foo()
          B = bar()
          Y= A+B
530       OPONERROR L2
          X = B/C
532       Y = A+C+B
          OPONERROR L2
          Z = X+C
512  L1:
          OPGOTO L42
516       OPTRYBODYEND
540  L2:
          OPSIDEEFFECT Y
          OPONERROR L3
518       OPTRYEND
     L42:
          System.Console.WriteLine("The value of Y was" Y);
     L3:
          T7 = OPADD Y, 13
560       RETURN T7
550       EXIT
          OPCATCH (Exception e)
               OPCALL System.Console.WriteLine("Error caught");
               RETURN L3
          }
552       EXIT
          OPFINALLY ( )
               System.Console.WriteLine("The value of Y was" Y);
               RETURN;
          }
          EXIT
```

FIG. 5

```
620   OPTRY
         OPONERROR L2
         A = foo()
         B = bar()
630      Y= A+B
         OPONERROR L2
         X = B/C
632      Y = A+C+B
         OPONERROR L2
         Z = X+C
      L1:
         OPGOTO L42
         OPTRYBODYEND
      L2:                              640
646
644      OPSIDEEFFECT Y
         OPONERROR L3
         OPTRYEND
      L42:
         System.Console.WriteLine("The value of Y was" Y);
      L3:
      L4
         T7 = OPADD Y, 13

RETURN T7
         EXIT
         OPCATCH (Exception e)
            OPCALL System.Console.WriteLine("Error caught");
            RETURN L3
         }
         EXIT
         OPFINALLY ( )
            System.Console.WriteLine("The value of Y was" Y);
            RETURN;
         }
         EXIT
```

FIG. 6A

TOOL FOR PROCESSING SOFTWARE PROGRAMS USING MODIFIED LIVE-NESS DEFINITION

RELATED APPLICATIONS

This application claims the benefit under 35 U.S.C. § 120 of U.S. application Ser. No. 11/036,862, entitled "SOFTWARE TOOL WITH MODELING OF ASYNCHRONOUS PROGRAM FLOW," filed on Jan. 14, 2005, which is herein incorporated by reference in its entirety.

BACKGROUND OF INVENTION

1. Field of Invention

This invention relates generally to computer software systems and more specifically to computer software systems that processes computer programs prior to execution.

2. Discussion of Related Art

Computer programs are often written as a series of instructions. Some instructions may specify operations that are performed when the program is executed. Other instructions may control program flow by specifying the order or conditions under which other instructions are executed. Yet other instructions may specify parameters of execution of the program, such as how information representing variables in the program is stored in memory attached to a processor executing the program.

In high level programming languages, the instructions do not necessarily correspond in a one-to-one relationship to instructions that can be executed by the platform on which the software will be executed. Rather, the instructions may be in a form that a human can understand. The program in this form must first be processed into a form appropriate to be executed by a specific platform. Platforms with different processors or different operating systems may require the program be represented differently for proper execution.

Software tools are usually used to convert the program into a form that may be executed by a specific platform. An example of a tool is a compiler. In addition to simply expressing each high level instruction as a series of instructions that a processor can execute, these tools may optimize the program or otherwise process it. Examples of processing that may be performed on a program as it is being prepared for execution are dead code removal, scheduling, code motion and common sub-expression elimination.

In processing the program, the software tool often coverts the code to an intermediate representation. The intermediate representation provides a convenient representation of the operations that must be performed when the program is executed. It also provides information about the variables that will be used to store information while the program executes, including information about the portions of the program which those variables are used. The intermediate representation also provides information about the program flow-between operations.

Often, the intermediate representation describes the flow of the program as a "flow graph." A flow graph contains blocks and edges. Each block represents a collection of instructions that will be executed in a prescribed order so that there is one starting point and one ending point for the block. In the flow graph, edges interconnect the blocks to indicate the order in which the blocks are executed. The flow graph includes edges that represent every possible path through the blocks that could be taken when the program is executed. Multiple paths may connect to each block.

Information about program flow and memory requirements can be used to process the program in multiple ways. It may be used to prepare instructions implementing the program for execution on a specific platform or may be used to make optimizations in a platform independent way.

FIG. 1A shows a program 100 written in the C# high level programming language. Program 100 includes a series of instructions, such as instructions 112 and 114. In the example of FIG. 1A, instructions 112 and 114 are "definitions" of the variable Y. As used herein, the term "definition" refers generally to any instruction that may create, modify or otherwise alter the information associated with a variable.

Program 100 also includes an instruction 120 that defines the beginning of a try body. Bracket 121 defines the end of the try body that begins with instruction 120. A try body is also sometimes called a "protected region of code."

The try body may work in connection with one or more protecting regions of code, which are sometimes also referred to as "protector regions" or "handlers." Here, two handlers are illustrated, an exception handler and a "finally" handler. An exception handler is also sometimes called a "catch handler." The exception handler begins with the instruction 122 and ends with bracket 123. The program 100 also has a finally handler associated with the try body. The finally handler begins with the instruction 124 and ends at the bracket 125.

Program 100 also includes instructions, such as instruction 130, located outside of the try body.

The operation of the handlers is illustrated by FIG. 1B, which illustrates execution of program 100. In this example, the try body 140 includes the first executable instructions within program 100. In normal operation, try body 140 will be executed first and the instructions in the try body 140 will be executed in an order specified by those instructions.

The instructions in the finally handler 144 are executed as the final instructions in the try region made up of try body 140, exception handler 142 and finally handler 144. In normal execution, when execution of the instructions within the try body 140 is done, execution passes to the finally handler 144.

After the instructions in finally handler 144 are executed, instructions in program 100 following try region 140 are executed. Here those instructions are in region 150.

The instructions in exception handler 142 are executed only if an exception occurs while instructions within try body 140 are being executed. An exception condition may be created by the execution of special exception instructions in program 100. However, in most cases exception conditions are caused by execution of an instruction within program 100 commanding the platform executing program 100 to perform an operation that is considered an illegal operation for that platform. Examples of illegal operations are divide by zero and instructions that instruct the platform to access memory at an address that is not installed in the system or is reserved by the operating system.

Exception handler 142 may be considered to be executed asynchronously. As used herein, the term "asynchronous" describes an event, such as an exception, that occurs in response to a condition during program execution other than an instruction in the program intended to cause the resulting transfer of control. Finally handler 144 may also be considered to be executed asynchronously because it could be executed following exception handler 142.

FIG. 1C is a flow graph that shows in more detail the possible paths from try body 140 to exception handler 142, thereby illustrating a problem that can arise from asynchronous events. Each of the instructions in try region 140 is represented as a block such as 162, 164, 166, 168, 170 or 172. Edges, such as edge 178 show the normal flow between the blocks. Edges 180A, 180B, 182, 184, 186, 188, 190 and 192 represent asynchronous edges. The asynchronous edges represent the possibility that execution of any instruction in try body 140 could cause program flow to be diverted to exception handler 142. Edge 180A represents the possibility that an error may occur prior to the execution of any instruction in try body 140. Edge 180B represents the transfer of control that occurs at the end of execution of exception handler 142.

Some prior art software tools have formed intermediate representations of programs including try regions from which asynchronous transfer of control is possible by adding an edge from every possible instruction from which flow could be transferred to a handler region 142 as illustrated in FIG. 1C. Adding edges from every instruction in the try region has been used to avoid errors that could result from processing an incomplete representation of a program.

However, a drawback of adding asynchronous edges using the "all possible edges" approach illustrated in FIG. 1C is the resulting complexity of the flow graph. Program 100 represents a relatively simple program. A commercially significant program may contain many more instructions than illustrated. In addition, a program may contain multiple try regions with multiple handlers associated with each region. Further, try regions may be embedded within other try regions. As a further complexity, it is not necessary that flow return to the end of a try body after execution of a handler. A handler may divert program flow to any location within the program or to any one of multiple locations in the program with the specific location determined by conditions at runtime. As a result, adding all possible asynchronous edges to a flow graph greatly complicates the flow graph. Processing a program based on such a flow graph may therefore take considerable time or computer resources.

In some prior art software tools, the complexity resulting from adding all possible asynchronous edges is avoided by creating flow graphs without asynchronous edges. However, to compensate, tools processing programs based on these flow graphs do not perform operations on instructions in the try regions that rely on an accurate representation of all possible flow paths. While processing a program in this fashion may be faster or simpler, the benefits of the software tools are not achieved.

It would be desirable to have a method of representing programs including asynchronous transfer of control to facilitate processing of the programs by software tools.

SUMMARY OF INVENTION

This patent application describes a method of processing a software program that uses a modified definition of live-ness that is useful in processing programs having asynchronous transfer. Described embodiments include use of this method to form an intermediate representation of programs having protected regions and protector regions. The intermediate representation has a reduced number of edges representing asynchronous flow, which simplifies processing of the program yet allows processing to be performed using conventional tools.

In one aspect, the invention relates to a method of processing a program having a plurality of regions and at least one handler. As part of the method, live-ness of a variable outside a first region is determined. The method includes classifying a variable as live outside the first region when the variable is used in any region, including the first region, following execution of the handler.

In another aspect, the invention relates to a method of determining live-ness of variables outside a first region of a program. The method includes forming an intermediate representation of the program. The intermediate representation includes a plurality of blocks having interrelationships defining at least successor blocks. A portion of the blocks represent portions of the first region and a portion of the blocks represent portions of the program separate from the first region. The method also includes identifying sets of live-in variables associated with the blocks. The method also includes identifying blocks that have asynchronous entrances. Live-out variables are accumulated by forming the union of selected sets of live-in variables. The selected sets of live-in variables comprise sets associated with selected blocks, wherein for a first portion of the selected blocks, each selected block represents a portion of the program separate from the first region and is a successor of a block representing a portion of the first region; and for a second portion of the selected blocks, each selected block represents a portion of the first region and has an asynchronous entrance.

In a further aspect, the invention relates to a computer-readable medium having stored thereon a data structure formed to represent characteristics of a program having a protected region, a handler and at least one region outside the protected region. The data structure has a plurality of data fields, each data field corresponding to a variable in the protected region of the computer program and storing a value indicative of whether the value is consumed outside the protected region or is consumed within a portion of the protected region that is accessible only after execution of the handler.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 is a textual representation of a flow graph useful in understanding an embodiment of the invention;

FIG. 6A is a textual representation of a flow graph useful in understanding an embodiment of the invention;

DETAILED DESCRIPTION

We have overcome limitations of the prior art by creating an intermediate representation of software that includes indications of the effect of asynchronous transfers. The intermediate representation may include less than all possible asynchronous edges, thereby simplifying the intermediate representation of the program and any processing based on it and ensuring accurate operation of tools that process the program using the intermediate representation. Effects of asynchronous transfers may be indicated in one or more ways. In some embodiments, the indication of the effect of an asynchronous transfer is in the form of an edge directly depicting the asynchronous transfer. In other embodiments, the effect of the asynchronous transfer is indicated by information stored in connection with a variable used in the program. The information may be stored in a symbol table or a pseudoinstruction in the intermediate representation. Multiple forms may be used to indicate the effect of an asynchronous transfer in the same intermediate representation.

The invention is first described using as an example an intermediate representation including a flow graph. The effects of selected asynchronous transfers are represented as edges in the flow graph. The effects of other asynchronous transfers are represented with annotations in a symbol table associated with the intermediate representation. Such a representation has the advantage of being compatible with existing software tools, but any suitable representation may be used.

The intermediate representation may represent the synchronous operations of the program in a traditional way. In one embodiment, all portions of a program are modeled as a flow graph using conventional techniques as are now known or hereafter developed. Asynchronous flow to handlers is not initially modeled in the flow graph. The intermediate representation then may be augmented or otherwise modified to represent the effects of asynchronous transfers.

Figures 1A, 1B:
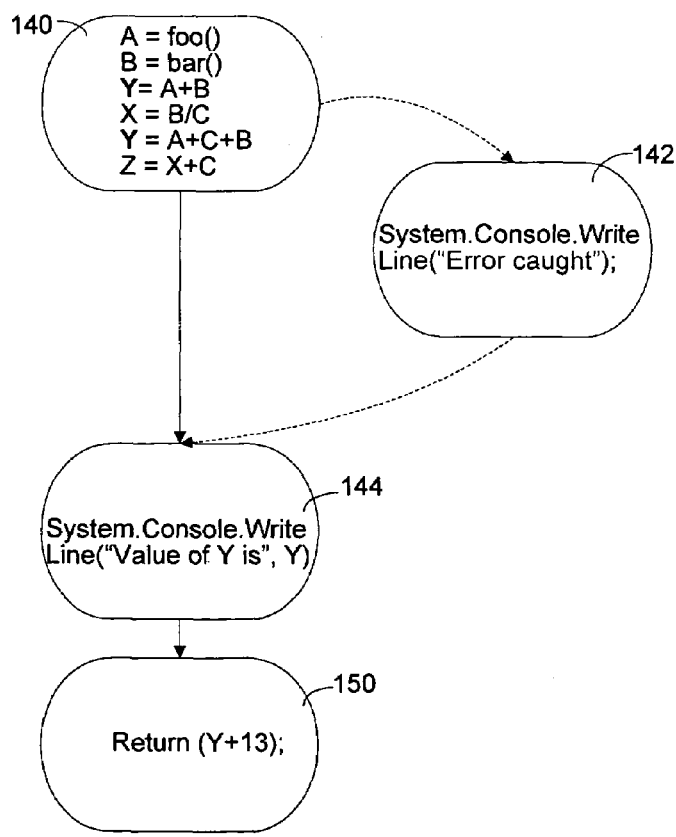
FIG. 1A is an illustration of a program written in a prior art high level programming language.
FIG. 1B is a graphical representation of the operation of the prior art program of FIG. 1A.
Figure 1C:
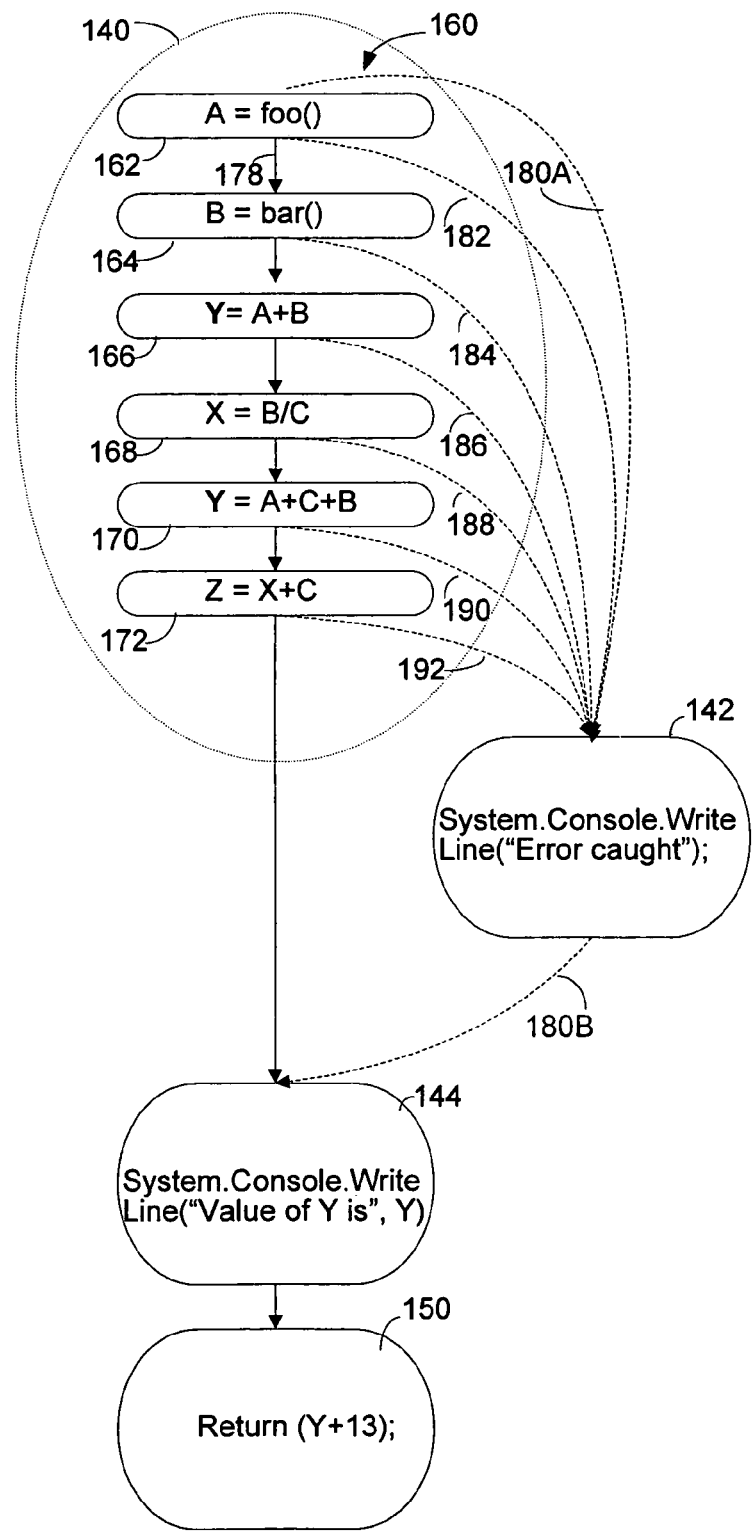
FIG. 1C is a graphical representation of a flow graph representing operation of the prior art program of FIG. 1A.
Figure 2:
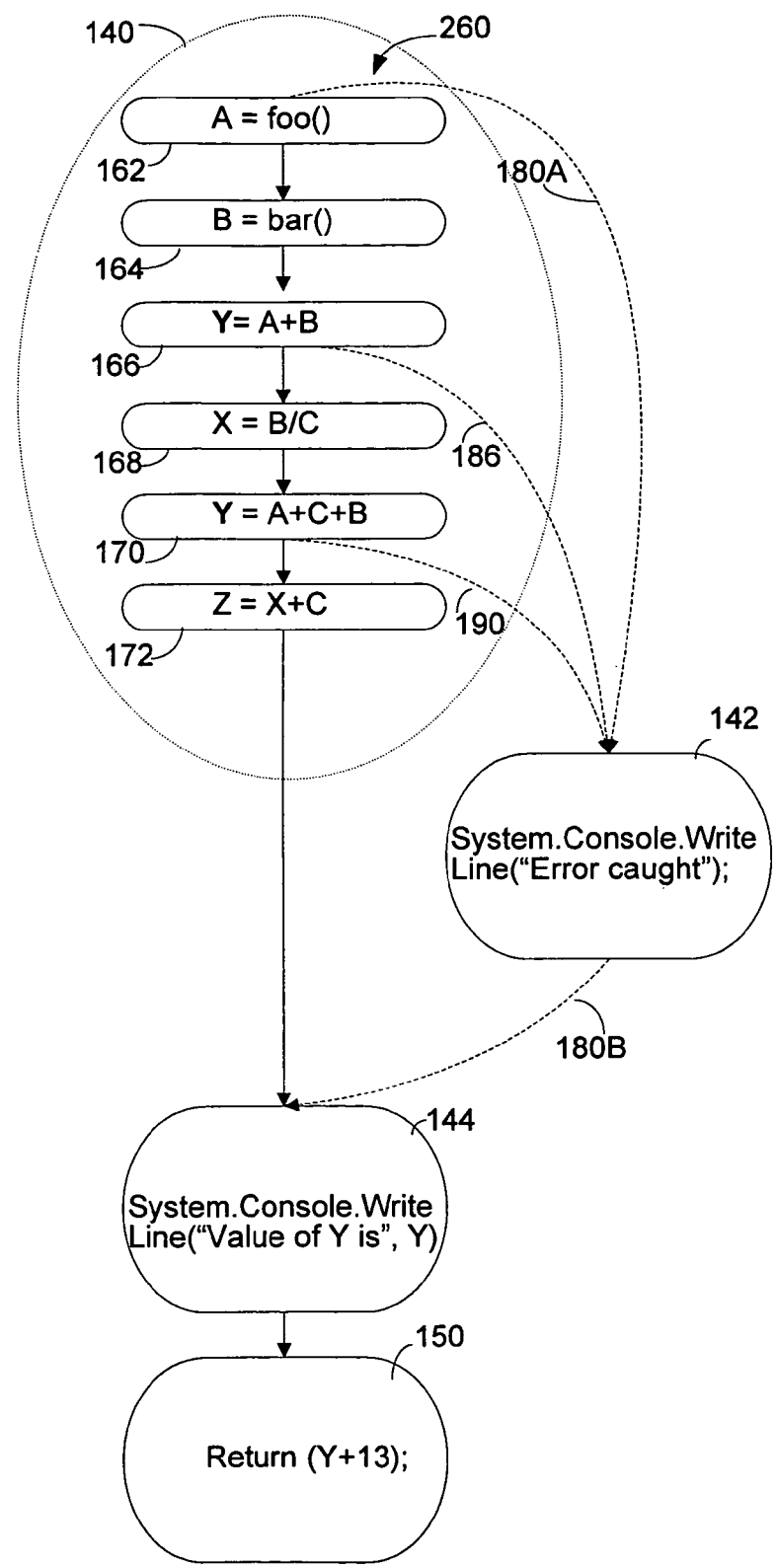
FIG. 2 is a graphical representation of a flow graph according to one embodiment of the invention.

FIG. 2 graphically illustrates a flow graph 260 of the same program as is depicted in FIG. 1C. Flow graph 260 includes asynchronous edges 180A, 180B, 186 and 190. Not all of the possible asynchronous are included in this representation. Asynchronous edges 186 and 190 are included in the flow graph because they allow traditional software tools to be operated using the flow graph without producing incorrect or unintended results. Edges 182, 184, 188 and 192 depicted in the "all possible edges" flow graph of FIG. 1C are not included because they are not required for traditional software tools to operate as intended using flow graph 260.

Edges 186 and 190 are selected for inclusion in flow graph 260 because they follow blocks that define a variable that is used outside of the try region containing those blocks. In this example, variable Y is used in region 150 and an asynchronous edge is added after each block that defines Y.

Conversely, no asynchronous edge is included after blocks 162, 164, 168 or 172. Though these blocks include definitions of variables such as A, B, X and Z, none of those variables is used outside of try body 140. Under some set of conditions that occurs during the execution of program 100, those instructions may be executed prior to execution of instructions in region 150. Under other conditions, because of asynchronous transfers, those instructions may not be executed. Nonetheless, because no instructions consume the variables they define if program flow is directed outside try body 140 by an asynchronous event, no errors are introduced if the flow graph does not represent the possibility of asynchronous transfers after those instructions. Accordingly, asynchronous edges 182, 184, 188 are not included in flow graph 260.

Identifying which variables are used outside of a region is a function traditionally performed in software tools. A variable that is used outside of a region is sometimes described as being "live-out" of that region. Algorithms for determining whether a variable is used outside of a region are called "live-ness" algorithms. Any process, whether now known or hereafter developed, for determining whether a variable is live-out of the try region may be used.

Further, the live-ness of the variables may be represented in any convenient way. For example, a symbol table may be constructed for each try region using one or more bit vectors, each describing a property that variables in that region may or may not have. One such bit vector may store an indication of whether the variables are live-out. Using bit vectors may reduce processing time. For example, each variable may be assigned an integer value that may be hashed to a particular bit location in the bit vector. As the live-ness computation is performed for each variable, the corresponding bit may be set or cleared based on whether the variable is live out. For each instruction that defines a variable, a simple access to the bit vector in the symbol table indicates whether an asynchronous edge should be added following that definition.

Figure 3:
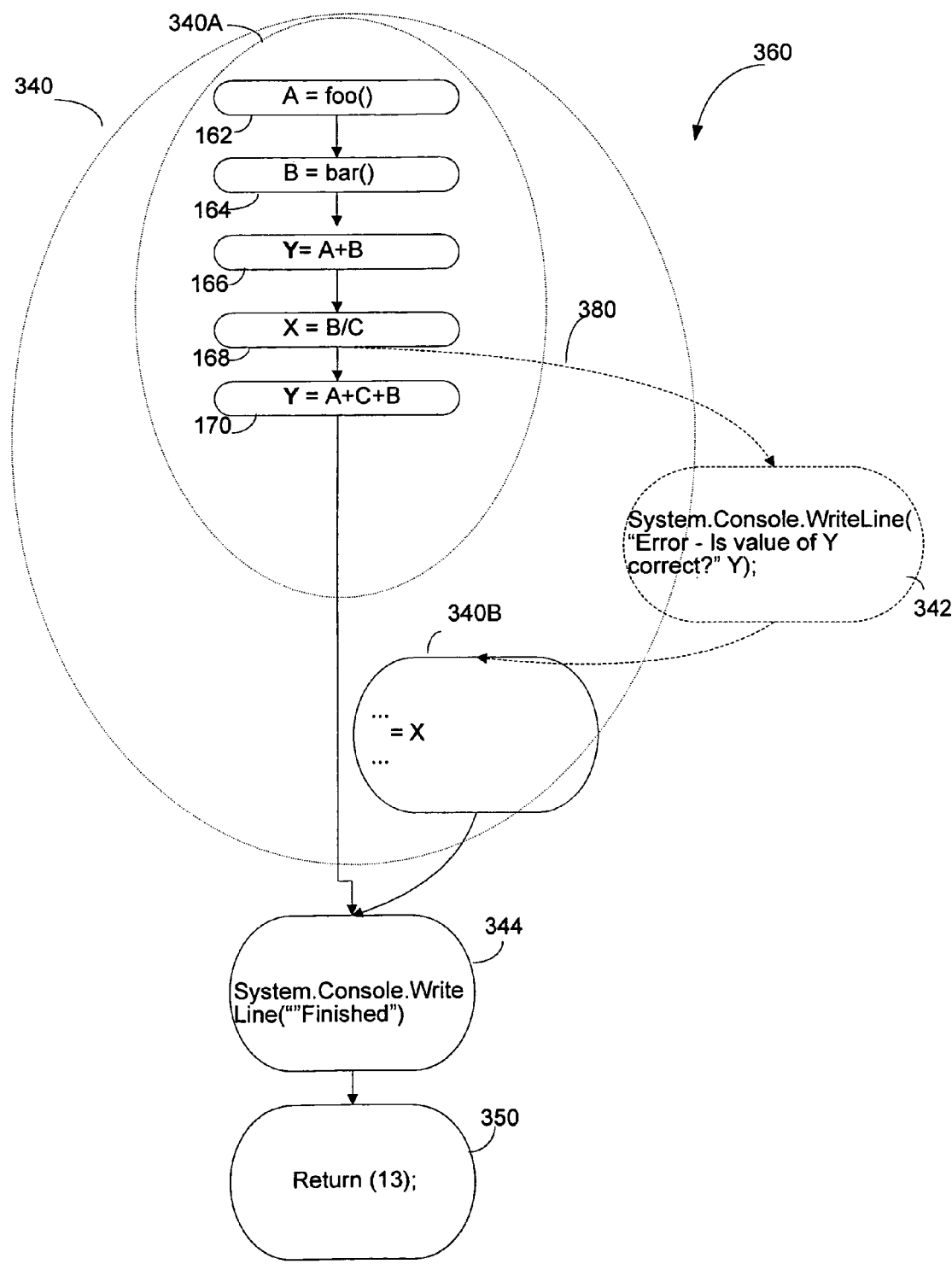
FIG. 3 is a is a graphical representation of a flow graph useful in understanding an embodiment of the invention.

The foregoing approach to adding edges to the intermediate representation does not, in some scenarios, adequately represent the effect of all asynchronous transfers. FIG. 3 illustrates a scenario in which a further representation of asynchronous transfers may be desired.

FIG. 3 illustrates a flow graph 360. The program illustrated in flow graph 360 includes a try body 340, an exception handler 342, a finally handler 344 and other code, represented by region 350, outside the try region. The program represented in FIG. 3 differs from program 100 (FIG. 1) in that, following execution of an exception handler 342, execution returns to a point within try body 340. Specifically, execution returns to block 340B.

In this example, block 340B contains code that has no entry point other than the entry point following the execution of exception handler 342. The code within block 340B also consumes a variable X, that would not, using traditional liveness, be considered live-out of try region 340. Accordingly, simply adding edges based on the live-ness of variables outside of the try region would not result in edges after definitions of X being included in the flow graph. However, not including an edge in the flow graph could lead to incorrect processing of the program based on the intermediate representation. For example, the representation could imply that no instructions "consume" the definition of X in instruction 168, allowing instruction 168 to be "optimized" out of the code. To avoid incorrect operation from using the intermediate representation, asynchronous edges are added following definitions of variables, even if not live-out of the try region, if they are consumed in blocks that form a portion of the try region that is only executed after an asynchronous transfer. Here flow graph 360 includes an edge 380 for this purpose.

In processing a program to form an intermediate representation, multiple embodiments are possible for adding edges following definitions of variables that are consumed in blocks within the try body that are only executed following an asynchronous transfer. In one embodiment, separate processing steps may be used to add asynchronous edges following definitions of variables that are live-out and after the definition of variables that are consumed within a handler.

Alternatively, the definition of live-out could be modified to encompass variables that are used in blocks of the try body that are only executed following an asynchronous transfer. Using a modified definition of live-out allows the bit vector used in the symbol table to represent live-out variables to contain a full list of the variables for which asynchronous edges must be added. As described above, once this bit vector is determined, one pass may be made through the intermediate representation, adding edges following each definition of a variable that is indicated in the live-out bit vector.

In some embodiments, the live-out bit vector may be formed in two or more passes. In the first pass, a traditional live-out computation may be performed on the try body. In a second pass, the variables that are consumed in blocks of the try body that are executed following asynchronous transfers may be incorporated into the live-out bit vector. Alternatively, a modified algorithm to identify live-out variables may be used such that the bit vector, indicating variables that are consumed outside of the try region and are consumed in blocks of the try region that are executed only after an asynchronous transfer, is formed in one pass. A program that may be used to construct a bit vector using the modified definition of live-out is described below.

FIG. 3 also illustrates another possible scenario in which merely adding asynchronous edges for variables that are live-out of the try region may not produce the desired result. In this example, the value of Y is not live-out, but is used in the exception handler 342. An intermediate representation formed as described above would not include an edge creating a flow path to indicate that an instruction within handler 342 using Y could be executed after a definition of Y in try body 340. As a result, tools operating on the intermediate representation could establish a memory structure for variable Y which, at run time, could not be accessed by code within exception handler 342.

For example, variable Y could be stored in a register or at a memory location in a stack determined dynamically at run time. The value stored in the register may be altered upon execution of the exception handler, which would have the undesired effect of charging the value of Y. Likewise, stack pointers and other constructs used to access information on a stack may change as program execution moves from the try body region to the exception handler. In contrast, variables used outside of try body region are generally stored in a way that allows them to be accessed after program flow leaves try body region 340.

An intermediate representation that does not include all possible asynchronous edges may not indicate a flow path between a definition of the variable Y and its use in exception handler 342. If it does not, traditional tools operating on the intermediate representation could allocate storage for variable Y in a fashion that makes the value of Y as used in the try body inaccessible from code within exception handler 342.

Unintended results may be avoided by including an edge after each definition of variable Y, which would reveal to any tool processing the intermediate representation that the variable might be consumed after flow leaves the try body because of an asynchronous transfer. More generally, an asynchronous edge may be added to the flow graph after each definition in a try body of a variable used within an associated handler.

As an alternative to adding an edge to the flow graph, the effect of the asynchronous transfer when a variable is used in a handler could be represented by an indication in the intermediate representation that the variable Y needs to be stored in memory in a manner that makes it accessible from code within exception handler 342. In one embodiment, this result is achieved by using constructs available in traditional intermediate representations of a program.

As a specific example, an annotation may be made in the symbol table constructed for try region 340. The symbol table may be annotated to indicate that the variable Y is used in a handler. Tools using the intermediate representation to allocate storage for variables may be constructed to recognize such an indication and require the variable to be "homed" to the stack along any path that could lead to the exception handler. A variable homed to the stack will have a specific location relative to the stack in which that variable is created. Homing the variable to the stack allows code to be generated for exception handler 342 that accesses that variable.

A similar annotation may be made for each variable that is defined within the try body and is not live-out, but is used within a handler attached to the try body. The term "use" in this context means that the variable could mean either that the variable is either defined or consumed.

The annotation in the symbol table may be made in any suitable form. If the symbol table includes a data structure, such as a bit vector, used for other purposes to indicate that a variable should be homed to the stack, values could be written to that data structure to indicate which variables are to be homed to the stack.

If no such data structure is used for other purposes, the symbol table could be constructed with a bit vector or other data structure to indicate which variables are used within handlers. A compiler or other tool generating machine executable code from the intermediate representation would generate, for each such variable, code to home the variable to the stack or otherwise allocate storage for the variable so that the variable is accessible in a handler associated with the try region that uses the variable.

Figure 4:
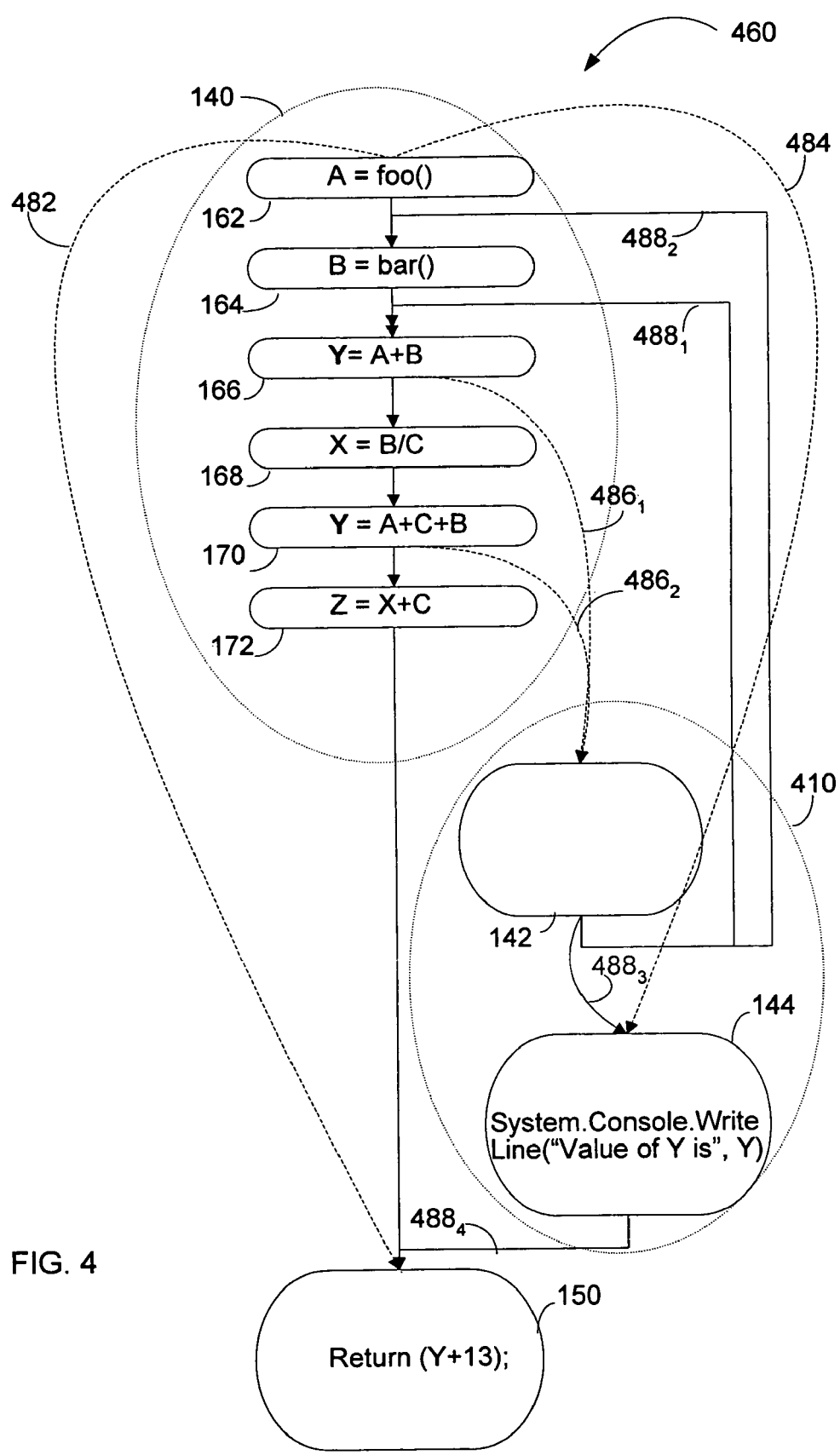
FIG. 4 is a is a graphical representation of a flow graph useful in understanding an embodiment of the invention.

FIG. 4 illustrates in further detail a flow graph used in an embodiment of the process of forming an intermediate representation of a program. FIG. 4 shows a flow graph 460, including a try region, an exception handler 142 and a finally handler 144. The flow graph is constructed according to the process described above.

The flow graph is created by initially forming a flow graph that represents only synchronous flow. Edges are selectively added to represent asynchronous transfers. Edge 482 is added to wrap the try body contents. It is included to simplify the prevention of rare, unreachable blocks in the try body. Edge 484 wraps the try body end. It guarantees a complete flow for anything reaching the try body. In the described embodiment, these edges are included in the intermediate representation for every try body including a handler regardless of where variables are defined or used.

Edges $486_1$ and $486_2$ represent edges that are added following definitions of live-out variables. Edges $488_1$, $488_2$ and $488_3$ represent possible return paths after execution of handler 142. Edge $488_4$ represents the return from the finally handler 144. Representation of these flow paths is desirable for accurate processing of the intermediate representation by most software tools.

However, simplifications may be made in the intermediate representation by modeling flow to and from the handlers by creating a "sink block." The sink block may be the destination of all edges added to the flow graph to represent the effects of asynchronous transfers from a try region. Edges to each possible place to which execution may flow after execution of a handler may emanate from the sink block.

In the example of FIG. 4, region 410 contains all of the handlers for try region 140. Region 410 could be represented as a sink block. Edges terminating at any place within region 410 could be depicted as terminating at the sink block. For example, edges 484, $486_1$ and $486_2$ could be indicated as terminating at the sink block. Edges emanating at any point in region 410 could be depicted as emanating from the sink block. For example, edges $488_1$, $488_2$, $488_3$ and $488_4$ could be depicted as emanating from the sink block.

Asynchronous edges that do not terminate or emanate at the sink block could be represented by edges that do. For example, edge 482 could be removed and replaced by an edge entering the sink block and an edge emanating at the sink block and terminating at region 150. However, edge 484 initiates at the same point as edge 482. Edge 482 already represents an edge to the sink block that would replace edge 482. Likewise, edge 488₄ already runs between the sink block and the termination point of edge 484. It is not necessary to include multiple edges between the same two points, and, therefore, in the example of FIG. 4, no additional edges need to be added to represent flow along edge 482 if a sink block is used.

In FIGS. 2, 3 and 4, blocks of the flow graph are represented by symbols and edges are represented by lines with arrows joining the symbols. Such a graphical representation is an aid for human conceptualization of the flow graph. A software tool need not produce a graphical representation of the flow graph. Each block in the flow graph could be represented as a line of text in a file, similar to an instruction in a computer program. Blocks could be identified by labels and edges could be represented by lines of text indicating branches to labels. However, the specific form chosen to represent the flow graph is not critical to the invention and any suitable representation may be used.

FIG. 5 illustrates a flow graph implemented as text in a computer file. Lines in the file contain intermediate instructions. The intermediate instructions need not have a one-to-one correspondence to either instructions used in the high level program or in a machine-language program generated from the intermediate representation. Preferably, the instructions are of a form that allows the intermediate representation to be easily generated from the high level program and allows machine level instructions to be generated from the intermediate representation. Such intermediate instruction sets are known and any suitable intermediate instruction set, whether now known or hereafter developed, may be used.

In the embodiment of FIG. 5, edges are represented by instructions that transfer program control. For example, instruction 512 includes the phrase "GOTO," which signals a transfer of control to the label identified in the instruction. Here, the label is indicated as L42. Label L42 precedes instructions in the finally handler and then in region 150 (FIG. 2) that are executed upon completion of execution of the instructions in the try body.

Blocks within the flow graph are represented in FIG. 5 by sequential instructions that are not interrupted by an instruction that transfers control or that otherwise signals the end of a region.

Not all intermediate instructions are translated into machine level instructions. Some instructions, called pseudoinstructions, are used to indicate how other instructions are to be processed. For example, instruction 514 identifies the beginning of a try region. Instruction 516 identifies the end of the try body region. Instruction 518 identifies the end of the try region.

Pseudo instructions are also used to represent the effects of asynchronous transfers. Instructions 520, 522 and 524 are pseudoinstructions that include the code OPONERROR and a label. These pseudoinstructions are similar to the GOTO instruction 512, but the code OPONERROR signifies a conditional, asynchronous transfer to the label. Instructions 520 and 522 represent effects similar to those represented by edges 482 and 484 shown in FIG. 4. Edge 524 represents effects similar to those represented by edge 488₃ in FIG. 4. Labels L1, L2 and L3 are added to the intermediate representation to provide destinations for instruction 520, 522 and 524.

Instructions 530 and 532 are also used to represent the effects of asynchronous transfers. They include the OPON-ERROR code followed by a label. Instructions 530 and 532 represent effects similar to those represented by edges 486₁ and 486₂ shown in FIG. 4.

As described above, the intermediate representation may include a symbol table or other data structures to provide further information about the program, such as which variables are live-out of a region or which variables should be homed to the stack. However, pseudoinstructions may also be used for this purpose.

Instruction 540 is a pseudoinstruction. As described above in connection with FIG. 3, the intermediate representation indicates whether a variable is used in handlers associated with a try body when the variable is not otherwise used outside of the try body. Instruction 540 includes a code, OPSIDEEFFECT, and a variable name. The instruction is used to indicate that the variable included in the instruction is used within a handler. As used herein, pseudo instruction in the form OPSIDEEFFECT Y indicates that the variable is consumed in a handler. In the form Y=OPSIDEEFFECT, the pseudoinstruction indicates that the variable is defined in a handler. Such an instruction may be used, for example, to influence storage of information associated with variables in a processor executing a machine code program formed from the representation. Additionally, it may be used to influence the way tools operate on the intermediate representation. For example, some tools perform "garbage collection," meaning that throughout the processing of the program the tool identifies memory locations allocated for storage of variables that are no longer needed. This memory is then indicated as available for further storage of information. Likewise, some tools perform "dead code" removal. These tools process the intermediate representation to identify and remove code that defines variables that are not subsequently consumed. Use of the pseudoinstructions precludes needed code from being removed or storage locations needed for variables to be overwritten if conventional garbage collection or dead code removal is performed based on the intermediate representation.

Representing uses of variables in this fashion also allows machine dependent global optimization to be performed on the intermediate representation. For example, some platforms may handle exceptions differently. On some platforms, the handler may be executed by as a separate function. When an exception occurs, the processor may overwrite unpredictably the contents of registers in the processor. Accordingly, a tool generating code for such a platform may, in response to such pseudoinstructions, generate instructions as part of the exception handler that cause the exception handler to reload the registers with the values of variables defined in the try body. The pseudoinstructions indicate that this code must be written for the exception handler to execute properly.

In the embodiment illustrated by intermediate representation 510, the exception handler is represented by instructions at 550 and the finally handler is represented by instructions at 552. The exception handler and finally handler are appended to the end of the EXIT instruction 560 for the method in which the handlers are active. The handlers could be processed as disjoint functions. In other embodiments, the specific code within the handlers may simply be ignored in further processing.

FIG. 6A shows an alternative embodiment of an intermediate representation 610. Intermediate representation 610 represents the same program as intermediate representation 510 (FIG. 5). Intermediate representation 610 is formed with a sink block 640. Similar to sink block 410 (FIG. 4), sink block 640 is the termination point for edges added to represent asynchronous transfers. The start of sink block 640 is here represented by the label L2.

Instruction 620 is an OPONEERROR pseudoinstruction pointing to the start of the sink block at label L2. Instruction 620 models the effects of both instructions 520 and 522 (FIG. 5). Likewise, instructions 630 and 632 are OPONEERROR pseudoinstructions pointing to label L2. Instructions 630 and 632 model the effects of instructions 530 and 532 (FIG. 5), respectively.

Sink block 640 includes instructions that represent edges from the sink block to each possible return from an asynchronous transfer. For example, in FIG. 5, an asynchronous transfer starting at instruction 520 returns at label L1. Asynchronous transfers starting at instructions 522, 530 or 532 return to label L2, from which flow passes through label L3 to resume normal processing. Accordingly, sink block 640 includes an instruction 644 that represents an edge returning to label L3.

Sink block 640 also includes pseudoinstructions signaling uses of variables in handlers that are not used outside of the try bodies associated with those handlers. Pseudoinstruction 646 signals that the variable Y is used within the handler. In this example, the variable Y is used in connection with a handler that returns to label L3. Instruction 646 therefore precedes instruction 644 that points to label 13. In this way, the use of a variable within a handler is indicated along a path in the flow diagram that correspond to a path through the handler during execution of the handler.

Figure 6B:
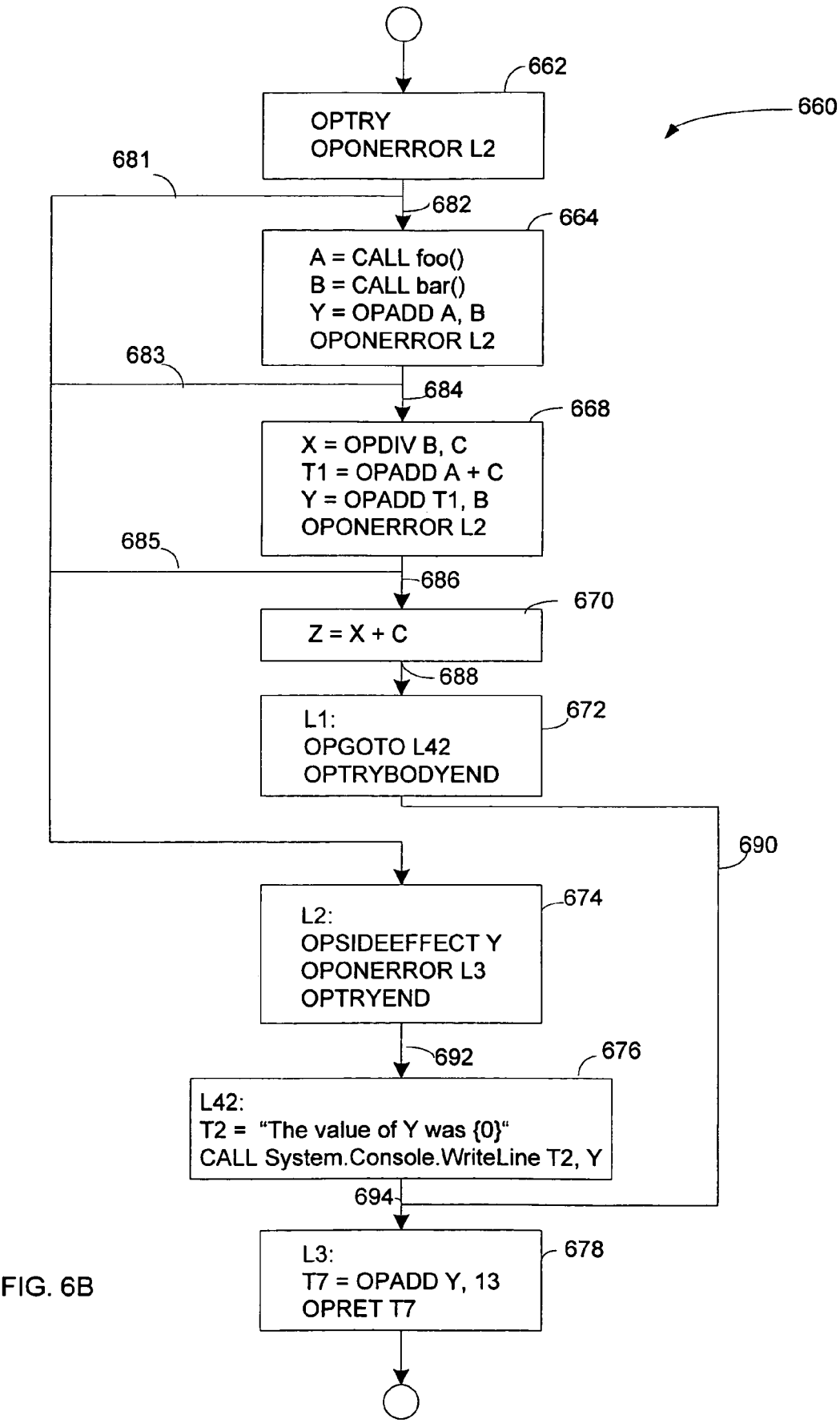
FIG. 6B is a graphical representation of a flow graph useful in understanding the textual representation of FIG. 6A.

FIG. 6B is a graphical illustration of the flow graph for the function illustrated in FIG. 6A. The function is here represented without the handlers. In the described embodiment, the protected regions of the program that are modeled separately from the protector regions. The protector regions may be modeled in a similar flow graph.

Flow graph 660 includes multiple blocks: 662, 664, 668, 670 and 672 representing the blocks of the try body region. Block 674 represents the sink block 640 (FIG. 6A). Block 676 includes the instructions executed as part of the finally handler. Block 678 represents instructions outside of the try body region.

The blocks are joined by edges. Edges 682, 684, 686 and 688 join the blocks in the try body. Edge 690 represents from form the try body to code following the try body. Edges 692 and 694 represent flow upon return from the handler. Edges 681, 683 and 685 represent asynchronous flow to the handler.

The instructions are divided into blocks as shown such that each block has a single entry point and a single exit point. Accordingly, the code is divided into blocks so that each block ends at a branch instruction. Likewise, a new block is started at any label that may be entered from more than one location.

Figure 7:
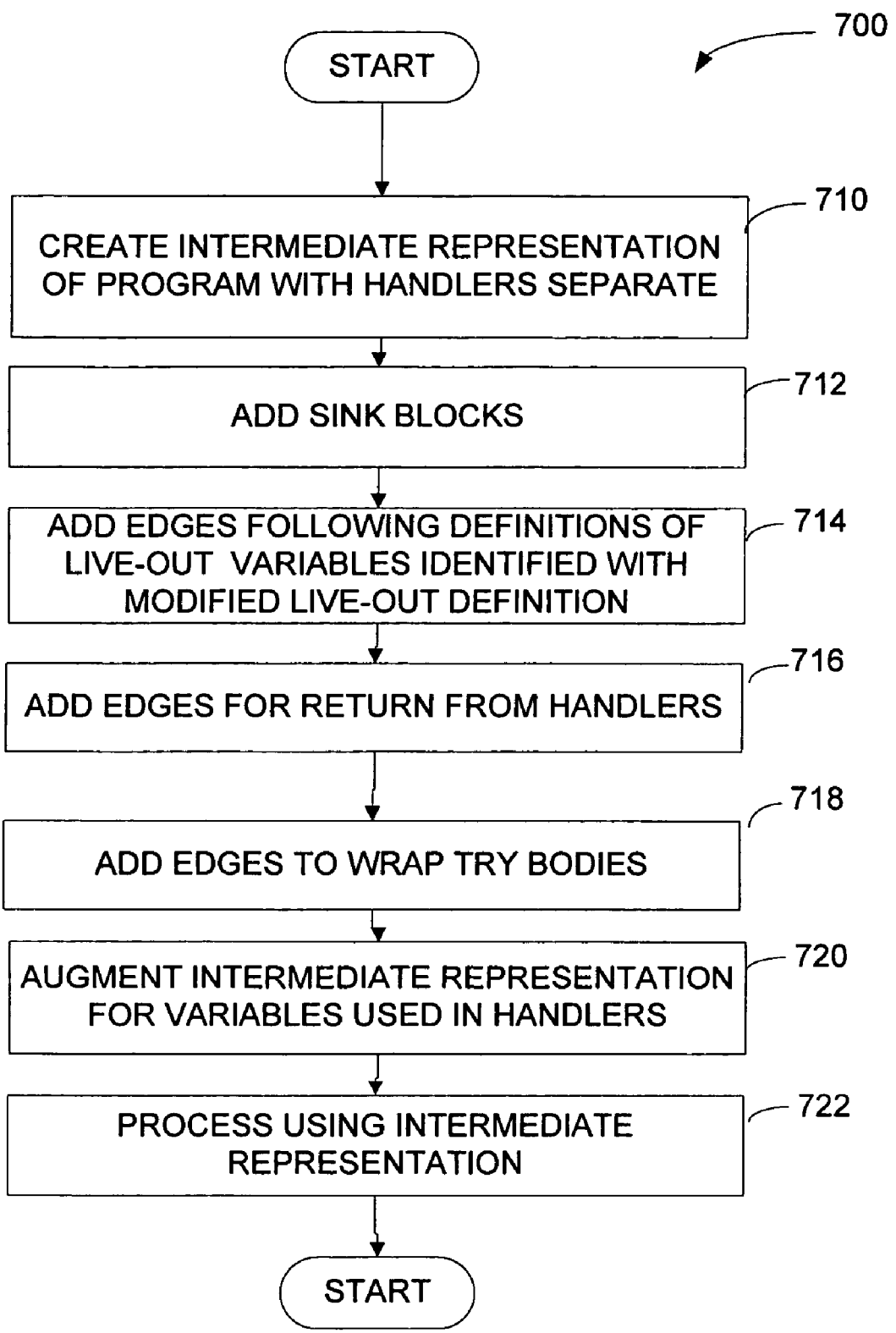
FIG. 7 is a flow chart illustrating processing of a program according to one embodiment of the invention.

Turning now to FIG. 7, a flow chart 700 of the processing of a program is illustrated. The process begins at process block 710. At process block 710, an intermediate representation of the program is formed, with the handlers treated separately. This representation does not model flow paths between the try regions and the respective handlers. Depending on the use to be made of the intermediate representation, the handlers may be omitted entirely. Representing flow to and from the handler and uses of variables within the handler may be adequate. Alternatively, the handlers may be represented as disjoint functions or represented in any other suitable way. The intermediate representation created at block 710 need not include representation of all possible edges to and from the handlers.

The intermediate representation formed at block 710 may be in any suitable form. For example, it may include graphical representations, as depicted in connection with FIGS. 3 and 4.

As another alternative, the intermediate representation may use instructions and text based instructions and pseudoinstructions such as are illustrated in connection with FIGS. 5 and 6A.

The intermediate representation may include all or a portion of the program to be processed. In the examples provided herein, a simple program with a single try region is used for purposes of illustration. The program to be processed may include multiple try regions, all of which may be processed in the same way as the try region illustrated.

At process block 712, sink blocks are added. In the illustrated embodiment, one sink block is added for each try region. However, it is not necessary that there be a one-to-one correspondence between sink blocks and try regions. For example, some try regions may be represented without a sink block. Other try regions may be represented with more than one sink block.

At process block 714 an edge is added following each definition of a variable that is live-out of the try body region. Each edge starts following the instruction and ends at the sink block for the associated handler. In the illustrated embodiment, the variables that are "live-out" of the try region are identified using a modified live-ness algorithm that classifies as live-out variables that are used in a portion of the try region that is only executed following asynchronous transfer from the try body. An example of such an algorithm is illustrated below in connection with FIGS. 8A and 8B.

At process block 716, the handlers are processed to identify all of the points to which execution could return following an asynchronous transfer. Edges are added from the sink block to each of these locations.

At process block 718, an edge to wrap each try body is added to the intermediate representation. An example of an edge to wrap a try body is instruction 620 (FIG. 6A).

At process block 720, the intermediate representation is augmented to represent variables that are not used outside of a try body but are used in a handler. The augmentation to the intermediate representation may be in any suitable form, such as a pseudoinstruction using the OPSIDEEFFECT code as instructions illustrated in FIG. 6A. An annotation may alternatively or additionally be made in a symbol table associated with the intermediate representation, or the information may be represented in the any suitable form.

At process block 722, the program is processed using the resulting intermediate representation. In one embodiment, the intermediate representation is used in a compiler. The compiler uses the intermediate representation for global optimization and code generation. It may be used for such processes as dead code removal, scheduling, code motion, garbage collection and common sub-expression elimination. The compiler may generate machine language code that can be loaded onto a processor based system and executed. However, the intermediate representation need not be used to create an executable file. The intermediate representation may be used in connection with an interpreted language in which machine language instructions are generated as the program executes. But, it is not necessary that the intermediate representation be used to generate machine language code at all. The intermediate representation could be used, for example, to aid in analysis of the program, to simulate operation or for any other desired purpose.

The processing depicted in FIG. 7 may be performed in any suitable manner. In one embodiment, the intermediate representation is created using a software tool running on a traditional computer. The software tool may be implemented in any suitable programming language, whether now know or hereafter developed.

FIG. 7 includes a process block 714 in which edges are added to the intermediate representation based on a modified live-ness definition. In accordance with the modified definition, variables are considered live if they are used after an asynchronous transfer out of the try body region. Variables may be considered live-out if they are live in another region of the program that is executed after the asynchronous transfer. They may also be considered live-out if they are live in a region of the try body that is accessed after an asynchronous transfer. If those variables are used only in that region, they would not already be included in the set of variables that is live-out of the try body and therefore would need to be added to the set.

Figure 8A:
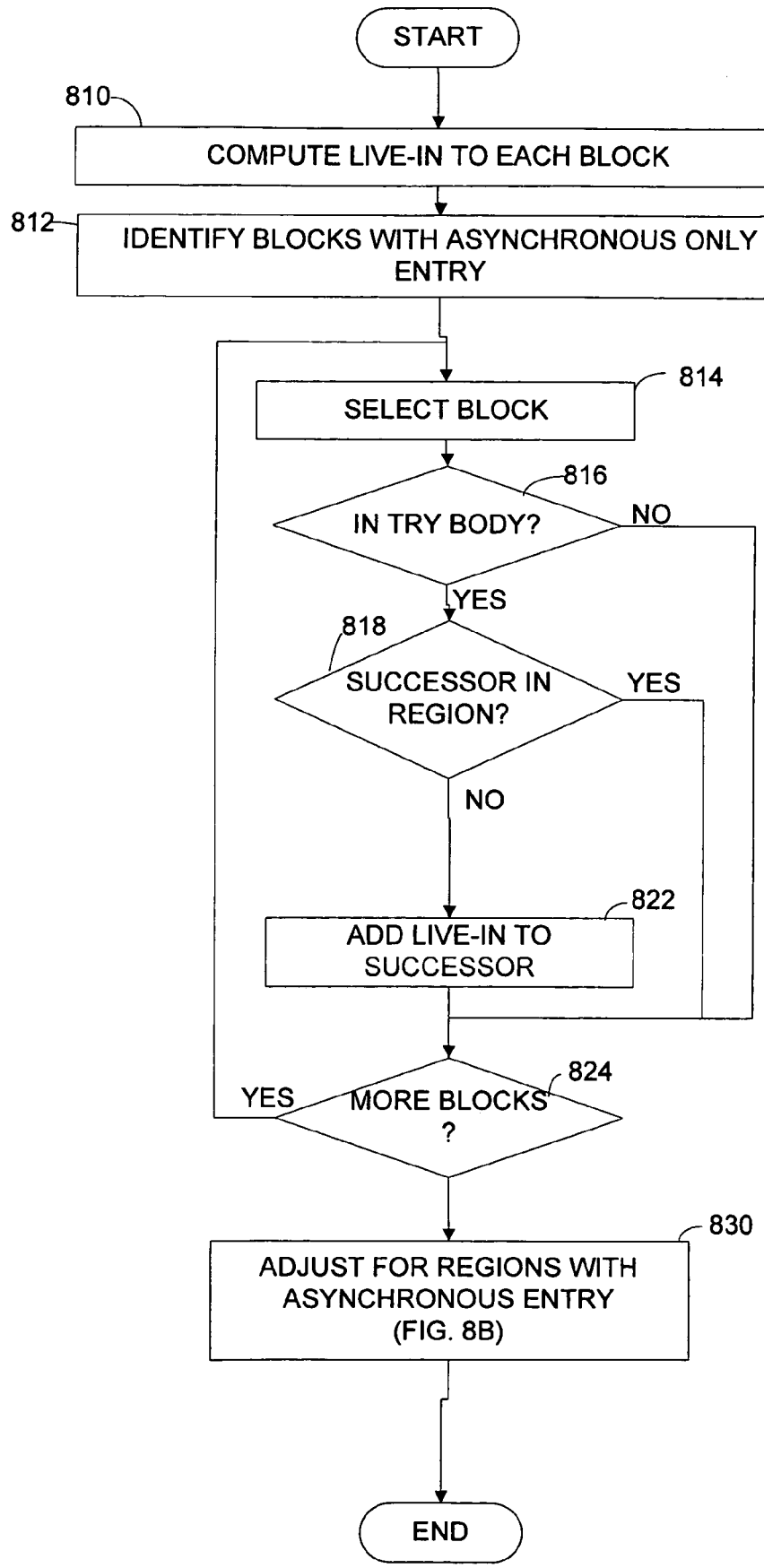
FIG. 8A is a flow chart illustrating processing of a program according to one embodiment of the invention.

FIG. 8A is a flow chart of a process for identifying the variables that are live-out of a try body region according to the modified definition. In the illustrated embodiment, the processing is performed on a function which is being compiled. However, the process may more generally be applied to any program or unit of code processed for any purpose.

The process starts at process block 810. The process shown in FIG. 8A begins after an intermediate representation is partially prepared. In the described embodiment, the process of FIG. 8A is performed before the initial intermediate representation is augmented to reflect the effects of asynchronous transfer.

In this form, the function has associated with it a flow graph, and blocks may be identified from the intermediate representation. The intermediate representation may also include a region graph, showing interconnections between regions in the function. In this example, each region has one of three types associated with it: try, handler or root. A root is the unprotected region at the top of the region tree. Regions may be nested such that the region graph may be considered as a tree, with branches defined by the manner in which the regions are nested.

The process of FIG. 8A may be implemented in any suitable way. In the described embodiment, the process is performed by a software driver used by a tool forming the intermediate representation. TABLE I gives an example of pseudocode that may be used to implement the process of FIG. 8A. Any suitable programming language may be used to create a program from the pseudocode. For example, the C++ or the C# programming languages could be used. The Attached Computer Program Listing (which forms a portion of the disclosure of this application) gives an example of how the pseudocode represented in TABLES I, II and III could be implemented.

At process block 810, the variables that are live-in to each block in the program is computed. In the pictured embodiment, the live-ness of the variables is determined with the handler regions disjoint from the flow graph so that uses of variables in the handler regions do not affect the live-ness calculation. However, a traditional live-ness computation may be used.

At process block 812, the blocks that have only asynchronous entry points are identified. Asynchronous entry points are identified by labels in the code that can not be reached other than from a transfer of control instruction in a handler region.

In subsequent steps of the process, the values representing which variables are live-in for each block in a every try region are aggregated on a region-by-region basis to create sets of all the variables that are live out for each try body region.

The blocks are processed one at a time starting at process block 814 where a block is selected. The pseudocode in TABLE I indicates that the flow graph associated with the function being compiled operates on a data structure, identified as list_of_basic_blocks, which lists all the blocks in that region. Thus, at process block 814, a block to be processed can be selected as the next block on this list, or in any other suitable fashion.

At decision process block 816, a check is made whether the selected block is within a try body region. In this example, sets of variables that are live-out of each try body are created so that edges that need to be added to the try body regions may be identified. Accordingly, blocks that are not in try regions need not be processed.

If the selected block is not in a try region, execution proceeds to decision process block 824. If, as determined at decision block 824, there are further blocks to process, execution returns to process block 814, where a further block is selected. Conversely, when no further blocks remain to be processed, execution passes to process block 830 for processing as described below. In the pseudocode of TABLE I, these steps are represented by a "foreach" instruction that indicates that each block in the function is processed.

If a selected block is within the try body region being processed, the process continues from decision block 816 to decision block 818. At decision block 818, a check is made whether the block that succeeds the selected block is also in the try body region being processed. As indicated by the "foreach" instruction in the pseudocode of TABLE I, where there is more than one successor block, each is considered.

If the successor block is in a different region, processing The set of variables that is live outside the try body region may be represented in any suitable fashion. Examples of data structures that may be used to represent a set of variables are bit vectors, lists and data tables. In the program given as an example in TABLE I, "live_out_of_region" refers to a data structure that may be formed in connection with each region and "live_in" refers to a data structure that is associated with each block. The union of these two data structures is computed. This operation indicates that when a successor block is outside of a region, the variables that are live in to that block are live out of the region that preceded it.

FIG. 8A shows that the process continues at decision block 824. If more blocks remain, the process returns to process block 814, where the further blocks are processed. As each block is processed, if it has a successor block that is outside the region, the variables live into that successor are added to the set representing variables live out of the region of the block being processed. Here, the variables are "added" using a logic UNION operation. If a variable is already listed as live outside the region, "adding" that variable to the list does not impact the list.

When all blocks in a function or other program are processed, the process proceeds from decision block 824 to process block 830. In this process block, adjustments are made for regions that have sections that are only reachable from a handler. The processing performed by process block 830 is performed by the method AsyncLiveOutOfRegion in the example of TABLE I, below and is explained in greater detail in connection with FIG. 8B, below.

TABLE I

AccumulateLiveOutOfRegion(Function func)
{
foreach (BasicBlock block in
func.FlowGraph.list_of_basic_blocks)
{
    Region currentRegion := block.region
    if (currentRegion.type is TRY)
    {
        foreach (BasicBlock successor in TABLE I-continued

```
            block.list_of_successors)
            {
                if (successor.region is not currentRegion)
                {
                    rgn.live_out_of_region :=
                        UNION(rgn.live_out_of_region,
                            successor.live_in)
                }
            }
        }
    }
    AsyncLiveOutOfRegion(func.RootRegion)
}
```

Figure 8B:
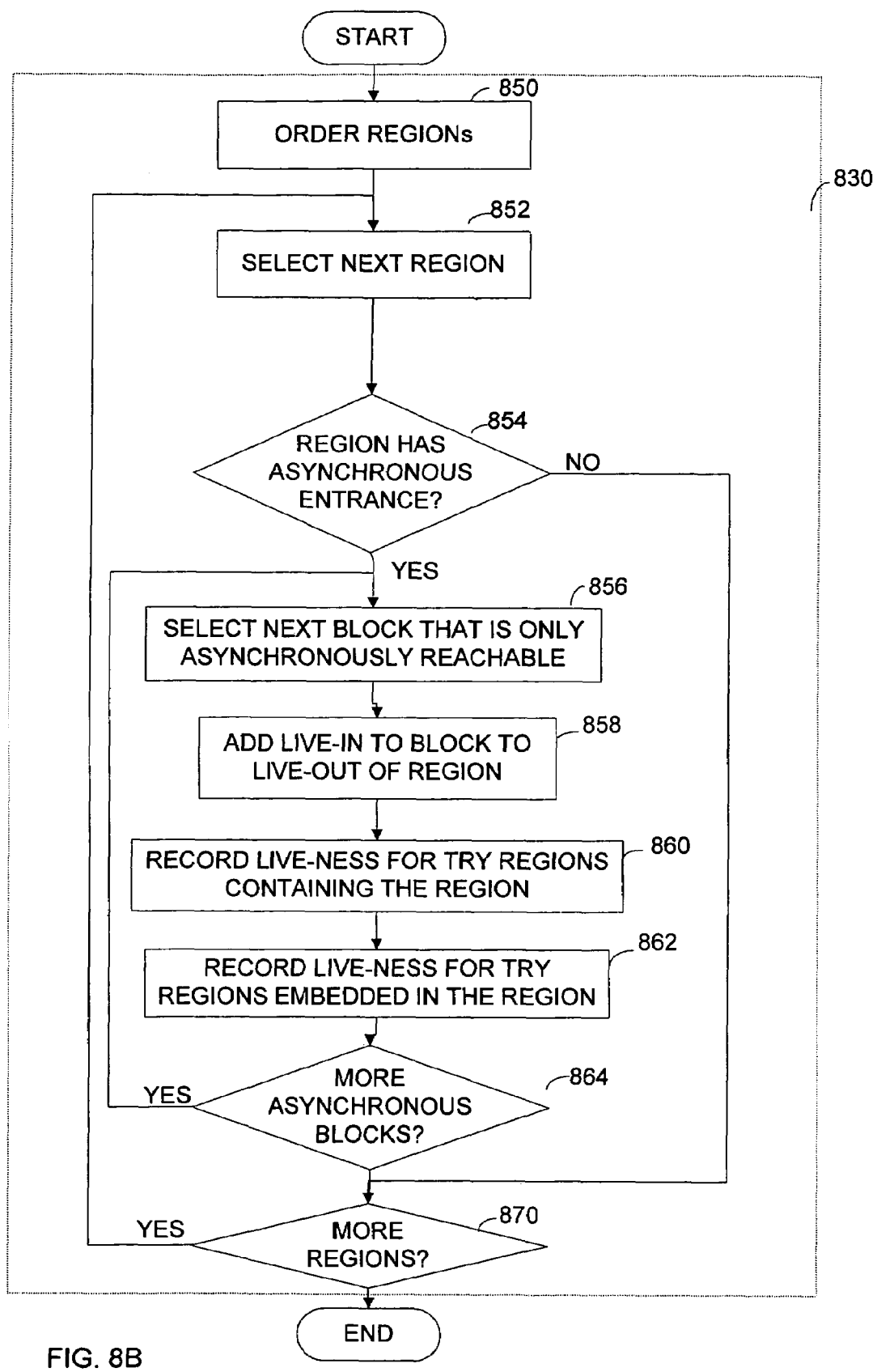
FIG. 8B is a flow chart illustrating processing of a program according to one embodiment of the invention.

The process performed by the method AsyncLiveOutOfRegion is shown in FIG. 8B. TABLE II gives an example of pseudocode that may be used to implement the method AsyncLiveOutOfRegion.

The process of FIG. 8B starts at process block 850. The processing of FIG. 8B is performed after at least one phase of constructing an intermediate representation has been completed. In this state, regions of the program being processed have been identified, as have the relationships between regions. Regions may be embedded in other regions, creating what may be regarded as a tree structure, with the regions forming nodes of the trees and the relationships between the regions defining the connections between the nodes.

The process represented by FIG. 8B orders the regions for processing, using the region tree structure to determine the order in which the regions are processed. In the described embodiment, the region tree is processed using a post-order traversal, so that embedded regions are processed first.

In the pseudocode example of TABLE II, the post-order traversal is achieved with a "foreach" loop that recursively invokes the same method. Each time the method is invoked, the region being processed invokes the method for all of its child, or embedded, regions. This recursion builds a stack of calls to the method until all regions to be processed are included in the stack. Each call is then processed from the stack in the inverse order it was placed on the stack, creating the post-order traversal. In the example of TABLE II, calls are made only if the region being processed is a try region.

In FIG. 8B, processing proceeds to process block 852. At process block 852, the next region to be processed is selected. If the region has no asynchronous entries, processing proceeds to decision block 870. No further processing is required for regions that have no asynchronous entries. Information indicating which regions include sections that are only reached by an asynchronous transfer may be collected at process block 812 (FIG. 8A).

Conversely, if a region has an asynchronous entry point, processing proceeds to process block 856. In the example of TABLE II, further processing is performed by the call to the method AsyncLiveOutOfATryRegion, which is show in greater detail in TABLE III. entry point856. further processing by the call to AsyncLiveOutOfATryRegion show in greater detail in TABLE III.

TABLE II

```
AsyncLiveOutOfRegion(Region parentRegion)
{
    foreach(Region childRegion in parentRegion.list_of_child_regions)
    {
        if (parentRegion.type is TRY)
        {
            AsyncLiveOutOfRegion(childRegion, func)
```

TABLE II-continued

```
        }
    }
    if (parentRegion.type is TRY)
    {
        if (parentRegion.has_asynchronous_entrance)
        {
            AsyncLiveOutOfATryRegion(parentRegion);
        }
    }
}
```

When a region includes at least one asynchronous entry point, processing continues at process block 856 where a block in the region that begins with an asynchronous entry is selected. Process block 856 is the beginning of a loop that ends with decision block 864, causing each of the blocks containing an asynchronous entry to be processed. In the pseudocode example of TABLE III, this loop is implemented by a "foreach" instruction.

For a block that includes an asynchronous entry point, processing in process blocks 858, 860 and 862 is performed. These process blocks correspond to methods AsyncUpdateLiveOutOfTry, AsyncUpdateContainingTryLiveness and AsyncUpdateContainedTryLiveness shown in TABLE III.

At process block 858 the variables identified as live into the block are added to the set of variables that are live out of the region containing the block being processed.

At process block 860, the variables identified as live-out of the region in step 858 are added to the set of variables identified as live out for a region in which that region is nested (i.e. the "parent" of the region).

At process block 862, the variables identified as live out of the selected block are added to the set of live-out variables that are live-out for any regions embedded in the region containing that block. The functionality of process block 862 may be implemented by a method, such as AsyncUpdateContainedTryLiveness illustrated in TABLE III. As shown, that method includes a "foreach" loop that calls the method recursively, indicating the processing is performed for each child region.

Following process block 862, decision block 864 is executed. If more blocks in the region have asynchronous entries, processing returns to process block 856, where the next block with an asynchronous entry is selected and processed.

When no more blocks with asynchronous entries remain, processing continues at decision block 870. If more try regions remain for processing, the process loops back to process block 852, where the next region is selected and processed.

TABLE III

```
AsyncLiveOutOfATryRegion(Region tryRegion)
{
    foreach (BasicBlock entranceBlock in
    tryRegion.list_of_asynchronous_entrances)
    {
        AsyncUpdateLiveOutOfTry(tryRegion, entranceBlock)
        AsyncUpdateContainingTryLiveness(tryRegion, entranceBlock)
        AsyncUpdateContainedTryLiveness(tryRegion, entranceBlock)
    }
}
AsyncUpdateLiveOutOfTry(Region tryRegion, BasicBlock entranceBlock)
{
    tryRegion.live_out_of_region :=
        UNION(tryRegion.live_out_of_region,
            entranceBlock.live_in)
```

TABLE III-continued

```
}
AsyncUpdateContainingTryLiveness(Region tryRegion,
BasicBlock entranceBlock)
{
    tryRegion.parent.live_out_of_region :=
        UNION(tryRegion.parent.live_out_of_region,
        entranceBlock.live_in)
}
AsyncUpdateContainedTryLiveness(Region tryRegion,
BasicBlock entranceBlock)
{
    foreach(Region childRegion in
    tryRegion.list_of_child_regions)
    {
        if (childRegion.type = TRY)
        {
            childRegion.live_out_of_region :=
                UNION(childRegion.live_out_of_region,
                    entranceBlock.live_in)
            AsyncUpdateContainedTryLiveness(childRegion,
            entranceBlock)
        }
    }
}
```

Having thus described several aspects of at least one embodiment of this invention, it is to be appreciated various alterations, modifications, and improvements will readily occur to those skilled in the art.

For example, the invention is illustrated as used in connection with a compiler. The invention may be useful in a traditional compiler that produces executable machine code that is loaded into a computer or other machine for execution. However, the invention may be used in connection with any software tool that processes programs. For example, the invention may be used in connection with a Just In Time (JIT) compiler that is resident on the processor executing a program and converts portions of the program to machine code as needed.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, one embodiment of the invention is directed to a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Further, terms such as "adding" and "aggregating" have been used to describe creation of a set of objects. In creating such a set, the order in which the members of the set are created or added to the set is not critical to the invention. Members of the set may be generated in any order or even simultaneously. The members of the set may be identified as members of the set in the order created or in any other order.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Computer Program Listing

Note that this is algorithm is performed on a flow graph that completely disregards all exception handlers. In JIT64 we chose to pull them out of the parent method and appended them to the EXIT statement at the end as disjoint functions. Other methods could ignore the handlers such as forming SESE regions.

After calculating live-in and live-out at the block level (in the parent method only) we need to map this to an EH region graph. Specifically we calculate live out of region for each try region. Then we extend the definition of live out of region using blocks that are only reached asynchronously. This extension occurs in MSIL_AsyncLiveOutOfRegion ( ) where the call site is in bold. The details of this callee are expanded on the following pages. What follows is the top level driver.

```
void
MSIL_AccumulateLiveOutOfRegion(
        PFUNC                   func,
        COMPILER_INSTANCE *ciPtr
){
        PARC            arc;
        PREGION         rgn;
        PBLOCK          blk,blkSucc;
        FOREACH_BLOCK_IN_FUNC(blk,func) {
                if (REGION_TYPE(FG_REGION(blk)) == RGN_TRY) {
                        rgn = FG_REGION(blk);
                        FOREACH_SUCCESSOR_ARC(arc, blk) {
                                blkSucc = FG_SINK(arc);
                                if (FG_REGION(blk) != FG_REGION(blkSucc)) {
                                        // Accumulate live_out_of_region.
                                        // as the sum of what's live in
                                        // to every successor block (at this point)
                                        // plus what's live into the top of the
                                        // try region.
                                        BvOr(REGION_LIVEOR(rgn),FG_LIVEIN(blkSucc));
                                }
                        }
                }
        }
        MSIL_EHFinalizeNonLocalFlow( ).
        if (DO_OPT_WITH_ASYNC_TRY_ENTRANCE) {
                // Handle Visual Basic flow graphs
                MSIL_AsyncLiveOutOfRegion(FU_REGION(func), func,
ciPtr);
        }
}
```

The top level driver performs a post-order traversal of the region tree. As it "pops back" from the recursion on the nodes in the tree, execution falls out of the loop. It then processes any region that's a try region (i.e., not a handler node in the EH region graph)

It uses the "worker" routine MSIL_AsyncLiveOutOfA-TryRegion detailed on the following page.

Intuitively, the simple recursive, post-order traversal of the EH region tree forces an "inside-out" ordering. Thus the deepest nested try regions are processed before any try regions that contain them.

```
void
MSIL_AsyncLiveOutOfRegion(
        PREGION                         rgnParent,
        PFUNC                           func,
        COMPILER_INSTANCE               *ciPtr
){
        PREGION rgnChild;
        FOREACH_CHILD_REGION_NOT_DEAD(rgnChild, rgnParent) {
                if (REGION_TYPE(rgnParent) == RGN_TRY) {
                        MSIL_AsyncLiveOutOfRegion(rgnChild,func,ciPtr);
                }
        } NEXT_REGION;
        if (REGION_TYPE(rgnParent) == RGN_TRY) {
                if (REGION_ASYNC_TRY_ENTRANCES(rgnParent)) {
                        MSIL_AsyncLiveOutOfATryRegion(rgnParent, func,
ciPtr);
                }
        }
}
void
MSIL_AsyncLiveOutOfATryRegion(
        PREGION                         rgnTry,
        PFUNC                           func,
        COMPILER_INSTANCE               *ciPtr
){
        PTUPLELIST                      tl;
        PBLOCK                          pblock;
        INT                             flagUpdate = 0;
        PTUPLE                          tupHead,tupTmp,tupLabel;
        ASSERTNR(REGION_TYPE(rgnTry) == RGN_TRY);
        ASSERTNR(REGION_ASYNC_TRY_ENTRANCES(rgnTry));
        FOREACH_TUPLIST_ELEM(tl, REGION_ASYNC_TRY_ENTRANCES(rgnTry))
```

```
{
        ASSERTNR(TU__ISLABEL(TLIST__TUPLE(tl)));
        // Then add what's live in to this (asynchronously
reachable)
        // subregion of a try body, to what's live outside the
entire
        // try. The set {live_out_of_region} is maintained on the
        // region node. This cached node data will be used for
        // incremental update after we process the entire try
body.
        // #1
        // Update the live out of region for this try.
        pblock =
MSIL__AsyncUpdateLiveOutOfTry(TLIST__TUPLE(tl),rgnTry,ciPtr);
        // #2
        // Now propagate the new information out to any other
        // _containING_ outer try body.
MSIL__AsyncUpdateContainingTryLiveness(rgnTry,pblock,ciPtr);
        // #3
        // Now propagate the new information out to any other
        // _containED_ deeper try body.
MSIL__AsyncUpdateContainedTryLiveness(rgnTry,pblock,ciPtr);
    }
}
```

Finally, we show the details of the algorithm to find the key blocks that allow us to extend the definition of live out of region.

```
// For this label in a try body that's only reached from a handler,
// find any new live_out_of_region contribution. This will be any
// upwards exposed USE that is on a path from the lable that marks
// the asynchornous entrance and is not reached from the top of the
// try via all the edges lexically contained in the try region.
PBLOCK
MSIL__AsyncUpdateLiveOutOfTry(
    PTUPLE          tupLabel,
    PREGION         rgnTry,
    COMPILER__INSTANCE *ciPtr
){
    PTUPLE tupFirstBlk;
    PBLOCK pFirstBlock;
    ASSERTNR(TU__REGION(tupLabel) == rgnTry);
    tupFirstBlk = TupFindPrev(tupLabel, TK__BLOCKTUPLE);
    ASSERTNR(tupFirstBlk && TU__ISBLOCK(tupFirstBlk));
    pFirstBlock = TU__BLOCK(tupFirstBlk);
    BvOr(REGION__LIVEOR(rgnTry),FG__LIVEIN(pFirstBlock));
    return pFirstBlock;
}
```

What is claimed is:

1. A method of processing a program having a plurality of regions including a first region that is a protected region associated with at least one handler, the at least one handler including at least one instruction for processing at least one exception occurring in the first region, wherein transfer of program control from the first region to the at least one handler is asynchronous upon occurrence of the at least one exception, the method comprising the acts of:
   (a) determining if a variable is used outside the first region, in any region to which a transfer of program control is synchronous from the first region;
   (b) determining if the variable is used outside the first region, in any region to which the transfer of program control is asynchronous;
   (c) determining if the variable is used in a portion of the first region that is only accessible following execution of the at least one handler; and
   (d) classifying the variable as live outside the first region when the variable is used outside the first region in any one or more of acts (a), (b), or (c).

2. The method of claim 1, comprising forming a data structure representing whether variables defined in the first region are classified as live outside the first region.

3. The method of claim 2, wherein forming a data structure comprises writing values to a symbol table formed by a compiler.

4. The method of claim 2, additionally comprising forming an intermediate representation of the first region, the intermediate representation including instructions with a portion of the instructions defining variables and a portion of the instructions defining edges indicating possible flow path between instructions, and forming the intermediate representation comprises including instructions defining edges following each instruction that defines a variable that the data structure indicates is live outside the first region.

5. The method of claim 2, wherein forming a data structure comprises forming a bit vector.

6. The method of claim 1, wherein the first region is a try region having try regions embedded therein and determining live-ness outside of a first region comprises determining live-ness outside of the lay region and determining the live-ness outside of the try regions embedded therein.

7. A method of determining live-ness of variables outside a first region of a program, the first region being a protected region associated with at least one, the at least one handler including at least one instruction for processing at least one exception occurring in the first region upon asynchronous transfer in response to the at least one exception the program having at least one portion separate from the first region, the method comprising:
   a) forming an intermediate representation of the program, the intermediate representation comprising a plurality of blocks having interrelationships defining at least successor blocks, with a portion of the blocks each representing a portion of the first region and a portion of the blocks each representing a portion of the program separate from the first region; and
   b) identifying a plurality of sets of live-in variables each set of variables associated with one of the plurality of blocks, the set of live-in variables defining variables that are live-in to the associated block; c) identifying blocks that have asynchronous entrances; and d) accumulating a set of live-out variables that is live-out of the first region by forming the union of selected ones of the plurality of sets of live-in variables, the selected sets of live-in variables comprising sets associated with selected blocks, wherein:
  i) for a first portion of the selected blocks, each selected block represents a portion of the program separate from the first region and is a successor of a block representing a portion of the first region;
  ii) for a second portion of the selected blocks, each selected block represents the at least one handler associated with the first region and has an asynchronous entrance; and
  iii) for a third portion of the selected blocks, each selected block represents a portion of the first region having at least one entrance accessible only following execution of the at least one handler.

8. The method of determining live-ness of variables outside a first region of a program of claim 7, wherein forming the intermediate representation of the program comprises forming an intermediate representation of the program without the at least one handler.

9. The method of determining live-ness of variables outside a first region of a program of claim 7, wherein the plurality of blocks and their interrelationships define a tree of blocks with at least one branch, wherein accumulating a set of live-out variables comprises:
  a) traversing the branch in a first direction and accumulating sets of live-in variables associated with blocks that represent a portion of the program separate from the first region and is a successor of a block representing a portion of the first region; and
  b) traversing the branch in a second direction while accumulating sets of live-in variables that are associated with blocks that represent the at least one handler associated with the first region and have an asynchronous entrance and blocks that represent a portion of the first region that have at least one entrance accessible only following execution of the at least one handler.

10. The method of claim 9, wherein the first region is a protected region and the method further comprises processing further branches, the further branches containing blocks representing portions of the protected region.

11. The method of claim 10, wherein traversing branches in the second direction comprises performing a post-order traversal of a tree representing the protected region.

12. The method of claim 9, wherein processing a branch comprises executing a software tool and traversing the branch in a first direction comprises recursively calling a method within the software tool.

13. The method of determining live-ness of variables outside a first region of a program of claim 7, wherein identifying blocks that have asynchronous entrances consists essentially of identifying blocks that have only asynchronous entrances.

14. The method of determining live-ness of variables outside a first region of a program of claim 7, wherein the first region has an embedded region embedded therein, the method additionally comprising accumulating a set of live-out variables that is live-out of the embedded region.

15. The method of determining live-ness of variables outside a first region of a program of claim 14, wherein accumulating a set of live-out variables that is live-out of the first region additionally comprises forming the union of the set of variables that is live-out of the embedded region with a set of variables that is live-out of the first region.

16. A computer system comprising a processor and a computer-readable medium having stored thereon a data structure formed to represent characteristics of a computer-executable program having a protected region, at least one handler, the at least one handler including at least one instruction for processing at least one exception occurring in the protected region up on asynchronous transfer in response to the at least one exception, and at least one region outside the protected region, the data structure comprising:
  a plurality of data fields, each data field corresponding to a variable in the protected region of the computer-executable program and storing a value indicative of if the variable is live;
  wherein the processor is programmed to determine if the variable is live by:
    (a) determining whether the variable is consumed outside the protected region;
    (b) determining if the variable is consumed within a portion of the protected region that is only accessible following execution of the at least one handler; and
    (c) classifying the variable as live if it is consumed in either determination (a) or (b).

17. The computer-readable medium of claim 16, wherein the data structure comprises a bit vector.

18. The computer-readable medium of claim 16, wherein the data structure is a portion of a symbol table constructed for the protected region.

* * * * *